(12) United States Patent
Anerousis et al.

(10) Patent No.: US 8,385,534 B2
(45) Date of Patent: Feb. 26, 2013

(54) METHOD FOR DISPATCHING SERVICE REQUESTS

(75) Inventors: Nikolaos Anerousis, Chappaqua, NY (US); Abhijit Bose, Paramus, NJ (US); Aliza R. Heching, Bergenfield, NJ (US); Milton H. Hernandez, Tenafly, NJ (US); Hani T. Jamjoom, White Plains, NY (US); Hoda Parvin, Ann Arbor, MI (US); Sreeram Ramakrishnan, Yorktown Heights, NY (US); Debanjan Saha, Mohegan Lake, NY (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1351 days.

(21) Appl. No.: 12/103,769

(22) Filed: Apr. 16, 2008

(65) Prior Publication Data

US 2009/0262923 A1   Oct. 22, 2009

(51) Int. Cl.
*H04M 3/00* (2006.01)
*H04M 5/00* (2006.01)
(52) U.S. Cl. .......... 379/265.11; 379/265.12; 379/265.13
(58) Field of Classification Search ........... 379/265.03–266.08, 265.01, 265.02
See application file for complete search history.

(56) References Cited

U.S. PATENT DOCUMENTS

| 5,006,983 | A | * | 4/1991 | Wayne et al. | 705/7.13 |
| 5,864,483 | A | | 1/1999 | Brichta | |
| 6,163,607 | A | * | 12/2000 | Bogart et al. | 379/266.01 |
| 6,286,104 | B1 | * | 9/2001 | Buhle et al. | 726/4 |
| 6,661,889 | B1 | * | 12/2003 | Flockhart et al. | 379/265.05 |
| 7,110,523 | B2 | | 9/2006 | Gagle et al. | |

* cited by examiner

*Primary Examiner* — Ahmad Matar
*Assistant Examiner* — Khai N Nguyen
(74) *Attorney, Agent, or Firm* — Daniel P. Morris; Ryan, Mason & Lewis, LLP

(57) ABSTRACT

Techniques for dispatching one or more services requests to one or more agents are provided. The techniques include obtaining one or more attributes of each service request, obtaining one or more attributes of each agent, obtaining feedback from each of one or more agent queues, and using the one or more attributes of each service request, the one or more attributes of each agent and the feedback from each of the one or more agent queues to determine one or more suitable agents to receive a dispatch for each of the one or more service requests. Techniques are also provided for generating a database of one or more attributes of one or more service requests and one or more attributes of one or more agents.

22 Claims, 4 Drawing Sheets

METHOD FOR DISPATCHING SERVICE REQUESTS

FIELD OF THE INVENTION

The present invention generally relates to information technology, and, more particularly, to service requests.

BACKGROUND OF THE INVENTION

Existing service (that is, non-manufacturing domains, such as but not limited to information technology (IT) service delivery, call centers, health care delivery, loan and/or mortgage processing, etc.) dispatching systems use a dispatcher, most often, a human agent generally knowledgeable in the relevant service industry, to allocate service requests to different service agent queues.

Existing methods for dispatching requests to service agents have numerous drawbacks. For example, existing approaches include ad hoc methods for determining how complex an incoming service request is, and for matching that request with the most appropriate agent skills. Also, existing approaches are not designed to consider the overall state of the system. Further, existing dispatching control systems assume stationary variance. For example, the skills and skill level of an agent remain constant with time, which is not appropriate in a service environment due to factors such as agent training, group dynamics, different tools and technologies used by agents to diagnose and fulfill service requests at different times.

Additionally, existing approaches do not account for variability in the skill levels of the different queue servers or differences in the complexity of the calls that arrive to the center when distributing the calls.

As described herein, significant improvement in service levels can be achieved by, for example, incorporating additional factors such as, for example, service complexity, priority, agent-skill variability set, and non-stationary variance, that are missing in existing approaches. Existing techniques are drawn largely from the manufacturing environment, and thus reflect the more stationary and predictable manufacturing setting where factors such as varying skill sets, agent training, or group dynamics are not relevant.

SUMMARY OF THE INVENTION

Principles of the present invention provide techniques for dispatching service requests. An exemplary method (which may be computer-implemented) for dispatching one or more services requests to one or more agents, according to one aspect of the invention, can include steps of obtaining one or more attributes of each service request, obtaining one or more attributes of each agent, obtaining feedback from each of one or more agent queues, and using the one or more attributes of each service request, the one or more attributes of each agent and the feedback from each of the one or more agent queues to determine one or more suitable agents to receive a dispatch for each of the one or more service requests.

In an embodiment of the invention, an exemplary method for generating a database of one or more attributes of one or more service requests and one or more attributes of one or more agents includes the following steps. One or more attributes of each service request are obtained. One or more attributes of each agent are obtained. Also, each attribute is stored in a searchable database, wherein the database is used to determine one or more suitable agents for each service request.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
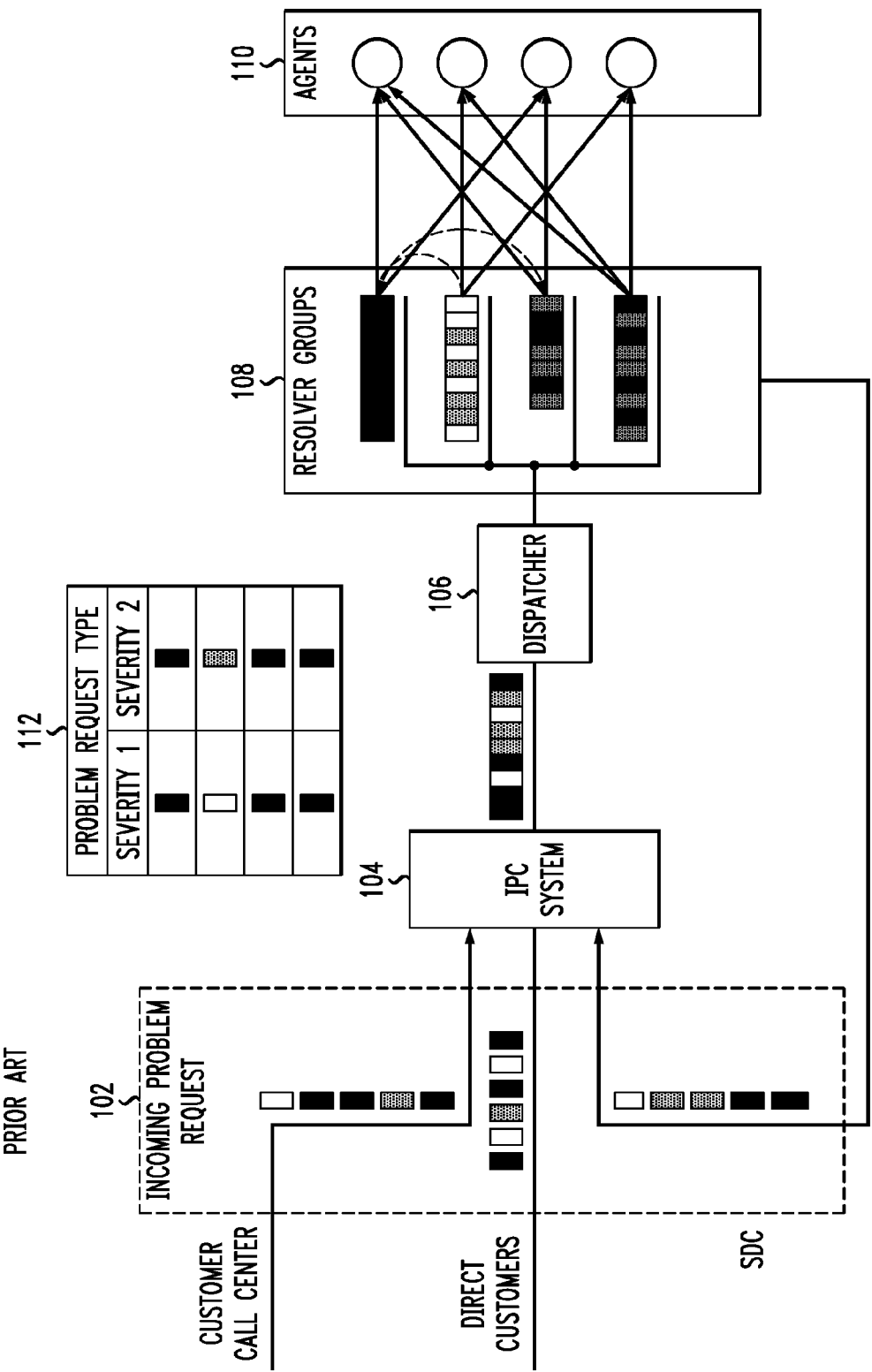
FIG. 1 is a diagram illustrating an existing dispatching system approach, according to an embodiment of the present invention.

Principles of the present invention include techniques for dispatching service requests to different agents. One or more embodiments of the invention consider several attributes of requests (for example, service complexity, priority, etc.), measure of agent attributes (for example, skills and variability measures) and feedback from individual agent queues while satisfying an overall objective for the dispatching system (for example, minimization of agent idle times, minimization of penalty due to service agreement violation, etc.). Principles of the invention also establish metrics that can be used for process control to monitor the state of a system for dispatching service requests.

One or more embodiments of the present invention can include the following illustrative steps. Requests for services arrive at a dispatcher (for example, a manual dispatcher, an automated agent, or a human agent assisted by an automated agent). The dispatcher determines the attributes of the service request and assesses the state of the system based upon feedback from the individual server queues. This feedback loop from individual agent queues can be used to determine the expected deadline of the service task for an agent.

Also, an algorithm can be used to determine a set of suitable agents whose attributes set (such as, for example, skills, skill level, and variability over time) can guarantee, within a user-defined limit, a deadline for completing the service request while meeting required system constraints (such as, for example, service agreement levels, deadlines, costs, etc.). The most suitable agent can then be selected, for example, using any heuristic search algorithm or mathematical optimization technique. An exemplary algorithm can include an index containing agents and their skill profiles, service requests currently being served, and expected cost of serving each incoming service request in queue by the set of most suitable agents, and determining an assignment of the incoming service requests to the most suitable agent such that average utilization of agents is kept at a specified level while keeping the cost of missing service levels on service requests to a minimum. Also, one or more embodiments of the invention are algorithm-neutral.

The techniques described herein include numerous advantages over existing approaches. For example, one or more embodiments of the invention choose an agent not simply based on the type of skills the agent may have, but also on other attributes such as the level and the variability of the agent's skills as compared to other agents in the system. Additionally, one or more embodiments of the present invention optimize a set of overall objectives for a system, increase the satisfaction probability of system objectives and constraints, and design for feedback from individual agent queues so that an accurate estimate of the expected service time of a service request can be made. Also, the techniques described herein explicitly allow for non-stationary service time variance which can arise, for example, when service agents are re-trained with different skills and levels. Further, one or more embodiments of the invention include techniques for a work-in-process to signal to a service request dispatching system.

FIG. 1 is a diagram illustrating an existing dispatching system approach, according to an embodiment of the present invention. By way of illustration, FIG. 1 depicts the elements of an incoming problem request 102, an inter-process communication (IPC) system 104, a dispatcher 106, resolver groups 108, agents 110 and a problem request type identification key 112. FIG. 1 presents an existing dispatching system used, for example, in many service delivery centers. A service request 102 arrives to the system 104 from one or more different sources. For example, a request can be forwarded by a call center when it cannot fulfill the request, and another can be created by the delivery center itself.

A dispatcher 106 manually determines the type of service needed in the request, indicating which skills are required to service the request. Once this service type determination is made, the dispatcher 106 places the request in a service queue. Each service queue is staffed by a group of agents 110 skilled in one or multiple types of services. The service request is either assigned to a specific agent by the dispatcher (that is, the push model) or it can be picked up by an agent from the queue (that is, the pull model). Further, in order to reduce set-up time, a dispatcher may choose to batch several service requests of similar type and priority before assigning them to specific agents or placing them in a specific queue.

Figure 2:
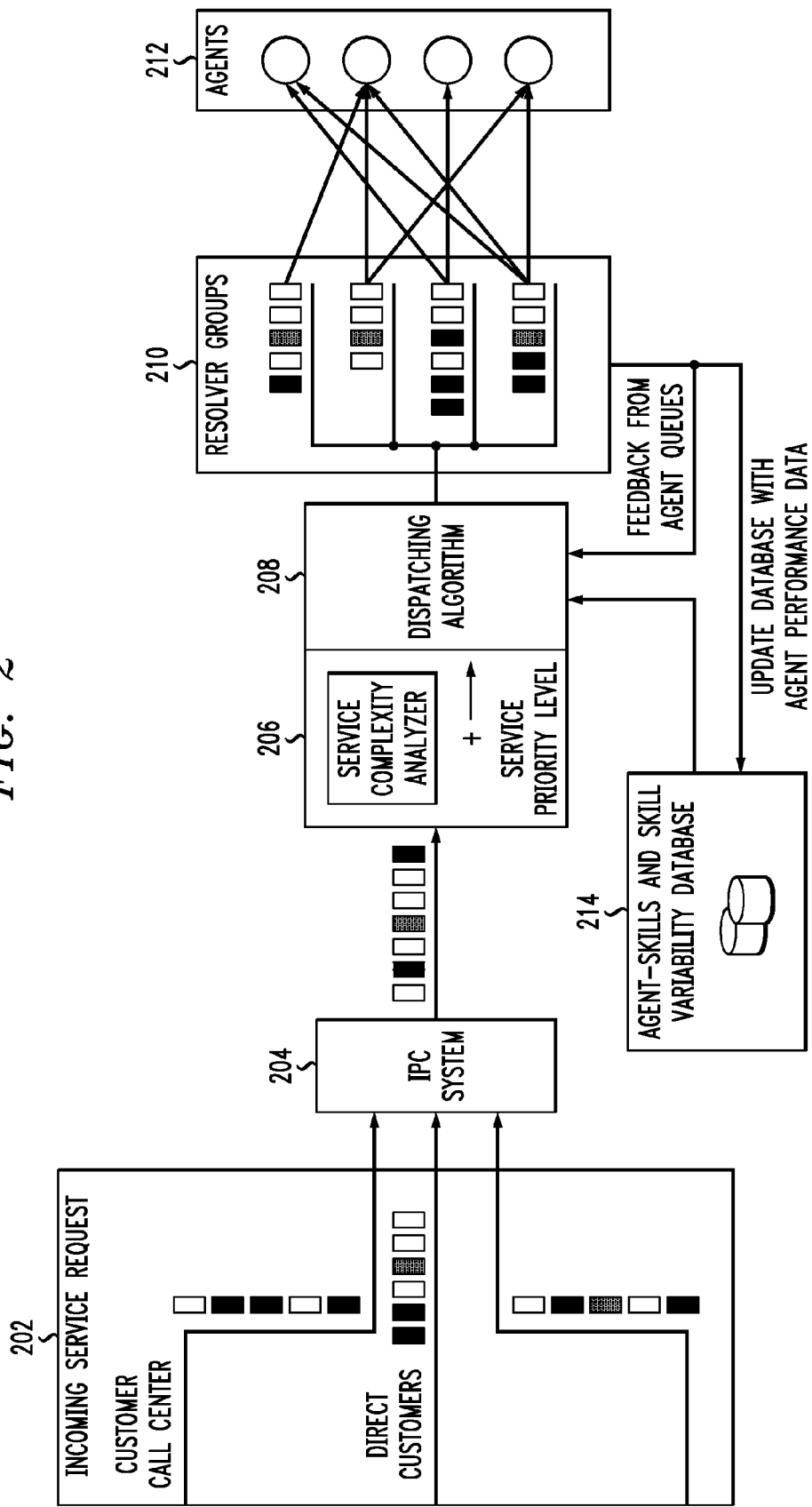
FIG. 2 is a diagram illustrating a dispatching system, according to an embodiment of the present invention.

FIG. 2 is a diagram illustrating a dispatching system, according to an embodiment of the present invention. By way of illustration, FIG. 2 depicts the elements of an incoming service request 202, an IPC system 204, a service request analyzer 206, a dispatching algorithm 208, resolver groups 210, agents 212 and an agent skills and skill variability database 214. As illustrated in FIG. 2, the dispatcher applies an algorithm to perform a service attribute classification (for example, based on, but not limited to, service complexity, priority, etc.) of the incoming request. The dispatcher can also use an agent-skills-variability matrix (database) 214 to determine a set of agents who will be able to perform the service, within a user-defined probability, while satisfying the system constraints. The database 214 can be used by an algorithm to choose a single agent (or a subgroup of agents if the service requires multiple agents) while satisfying a system objective.

The system can also allow for non-stationary variance in service attributes, agent skill levels, and queue lengths, to monitor system performance. Automated and manual notification via communication devices, such as email or pagers, can serve to alert those who monitor the system if system objectives deviate outside of specified limits.

Figure 3:
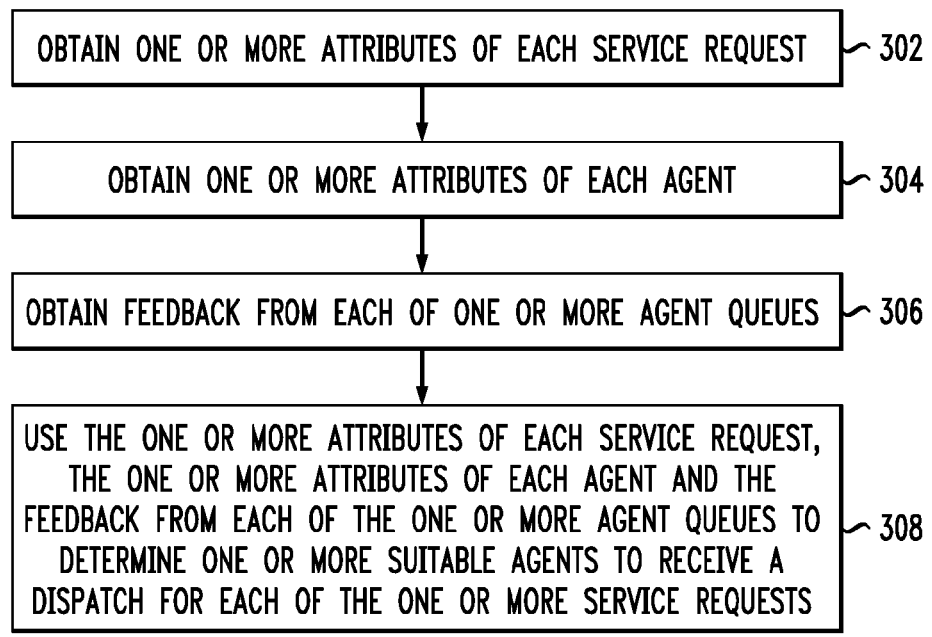
FIG. 3 is a flow diagram illustrating techniques for dispatching one or more services requests to one or more agents, according to an embodiment of the present invention.

FIG. 3 is a flow diagram illustrating techniques for dispatching one or more services requests to one or more agents, according to an embodiment of the present invention. Step 302 includes obtaining one or more attributes of each service request. Service request attributes can include, for example, service complexity, location of service origination, location of delivery, and/or priority. Step 304 includes obtaining one or more attributes of each agent. Agent attributes can include, for example, skill identification, skill level and a variability measure. Step 306 includes obtaining feedback from each of one or more agent queues. Queue feedback can include, for example, the amount of time and/or resources each agent has spent on a service request, the status (that is, request lifecycle) of a service request, etc.

Step 308 includes using the one or more attributes of each service request, the one or more attributes of each agent and the feedback from each of the one or more agent queues to determine one or more suitable agents to receive a dispatch for each of the one or more service requests. Determining a suitable agent can include using a heuristic search algorithm and/or a mathematical optimization technique. Also, determining a suitable agent can include selecting the most appropriate agent based on agent skill, agent service time variability, service deadline, system objectives and constraints.

Further, using the service request and agent attributes, as well as the agent queue feedback to determine a suitable agent can include, for example, classifying each service request based upon the attributes of each request and the attributes of each service agent.

The techniques depicted in FIG. 3 can also include providing queue level system status notifications, wherein notifications are delivered, for example, via electronic mail (e-mail), pager and/or short message service (SMS). A human dispatcher and/or an automated agent can receive these notifications. Also, one or more embodiments of the present invention can include providing an alert when a dispatching system objective violates a threshold, wherein the alert is delivered via, for example, e-mail, pager and/or SMS.

Additionally, the techniques depicted in FIG. 3 can include establishing an appropriate service queue length, wherein the queue length can be defined by, for example, time, number of requests in the queue, and/or weighted variations thereof. These control values may differ by service agent queue.

Figure 4:
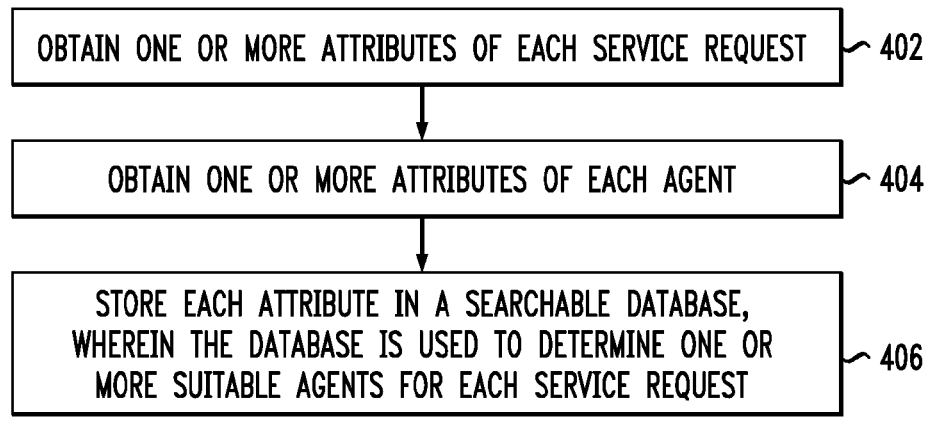
FIG. 4 is a flow diagram illustrating techniques for generating a database of one or more attributes of one or more service requests and one or more attributes of one or more agents, according to an embodiment of the present invention.

FIG. 4 is a flow diagram illustrating techniques for generating a database of one or more attributes of one or more service requests and one or more attributes of one or more agents, according to an embodiment of the present invention. Step 402 includes obtaining one or more attributes of each service request. Service request attributes can include, for example, service complexity and priority. Step 404 includes obtaining one or more attributes of each agent. Agent attributes can include, for example, skill identification, skill level and a variability measure. Step 406 includes storing each attribute in a searchable database, wherein the database is used to determine one or more suitable agents for each service request.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
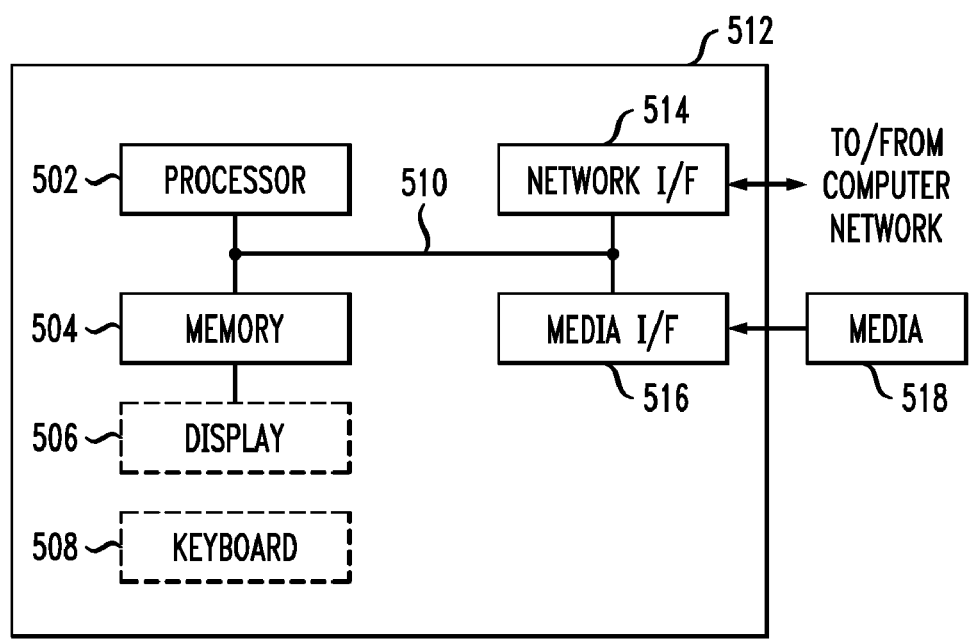
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, designing for feedback from individual agent queues so that an accurate estimate of the expected service time of a service request can be made.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for dispatching one or more services requests to one or more agents, comprising the steps of:
    obtaining one or more attributes of each service request;
    obtaining one or more attributes of each agent;
    obtaining feedback from each of one or more agent queues, the feedback from each of the one or more agent queues comprising an amount of time or resources each agent has spent on each service request, and a status of each service request, wherein the feedback from each of the one or more agent queues determining an estimate of an expected service time of each service request; and
    using the one or more attributes of each service request, the one or more attributes of each agent and the feedback from each of the one or more agent queues to determine two or more suitable agents to receive a dispatch for each of the one or more service requests and to classify each service request based upon the one or more attributes of each request and the one or more attributes of each agent, wherein one or more steps of said method are performed by one or more hardware devices.

2. The method of claim 1, wherein the one or more attributes of each service request comprise at least one of service complexity, location of service origination, location of delivery, and priority.

3. The method of claim 1, wherein the one or more attributes of each agent comprise at least one of skill identification, skill level and a variability measure.

4. The method of claim 1, wherein determining suitable agents to receive a dispatch for each of the one or more service requests comprises using at least one of a heuristic search algorithm and a mathematical optimization technique.

5. The method of claim 1, wherein determining suitable agents to receive a dispatch for each of the one or more service requests comprises selecting a most appropriate agent based on agent skill, agent service time variability, service deadline, one or more system objectives and one or more constraints.

6. The method of claim 1, further comprising providing one or more queue level system status notifications.

7. The method of claim 6, wherein the one or more notifications are delivered via at least one of electronic mail (e-mail), pager and short message service (SMS).

8. The method of claim 1, further comprising providing an alert when a dispatching system objective violates a threshold.

9. The method of claim 5, wherein the alert is delivered via at least one of electronic mail (e-mail), pager and short message service (SMS).

10. The method of claim 1, further comprising establishing an appropriate service queue length.

11. The method of claim 10, wherein the queue length is defined by at least one of time, number of requests in the queue, and weighted variations thereof.

12. A method for generating a searchable database of one or more attributes of one or more service requests and one or more attributes of one or more agents, comprising the steps of:
   obtaining one or more attributes of each service request;
   obtaining one or more attributes of each agent;
   obtaining feedback from each of one or more agent queues, the feedback from each of the one or more agent queues comprising an amount of time or resources each agent has spent on each service request, and a status of each service request, wherein the feedback from each of the one or more agent queues determining an estimate of an expected service time of each service request;
   storing each attribute and the feedback from each of the one or more agent queues in the searchable database, wherein the searchable database is used to determine two or more suitable agents for each service request; and
   classifying each service request based upon the one or more attributes of each request and the one or more attributes of each agent, wherein one or more steps of said method are performed by one or more hardware devices.

13. The method of claim 12, wherein the one or more attributes of each service request comprise at least one of service complexity, location of service origination, location of delivery, and priority.

14. The method of claim 12, wherein the one or more attributes of each agent comprise at least one of skill identification, skill level and a variability measure.

15. A computer program product comprising a non-transitory computer readable medium having computer readable program code for dispatching one or more services requests to one or more agents, which when executed implements the steps of:
   obtaining one or more attributes of each service request;
   obtaining one or more attributes of each agent;
   obtaining feedback from each of one or more agent queues, the feedback from each of the one or more agent queues comprising an amount of time or resources each agent has spent on each service request, and a status of each service request, wherein the feedback from each of the one or more agent queues determining an estimate of an expected service time of each service request; and
   using the one or more attributes of each service request, the one or more attributes of each agent and the feedback from each of the one or more agent queues to determine one or more suitable agents to receive a dispatch for each of the one or more service requests, and to classify each service request based upon the one or more attributes of each request and the one or more attributes of each agent.

16. The computer program product of claim 15, wherein the computer readable program code for determining suitable agents to receive a dispatch for each of the one or more service requests comprises computer readable program code for using at least one of a heuristic search algorithm and a mathematical optimization technique.

17. The computer program product of claim 15, wherein the computer readable code for determining suitable agents to receive a dispatch each of the one or more service requests comprises:
   computer readable program code for selecting a most appropriate agent based on agent skill, agent service time variability, service deadline, one or more system objectives and one or more constraints.

18. A computer program product comprising a non-transitory computer readable medium having computer readable program code for generating a searchable database of one or more attributes of one or more service requests and one or more attributes of one or more agents, which when executed implements the steps of:
   obtaining one or more attributes of each service request;
   obtaining one or more attributes of each agent;
   obtaining feedback from each of one or more agent queues, the feedback from each of the one or more agent queues comprising an amount of time or resources each agent has spent on each service request, and a status of each service request, wherein the feedback from each of the one or more agent queues determining an estimate of an expected service time of each service request;
   storing each attribute and the feedback from each of the one or more agent queues in the searchable database, wherein the searchable database is used to determine two or more suitable agents for each service request; and
   classifying each service request based upon the one or more attributes of each request and the one or more attributes of each agent.

19. An apparatus for dispatching one or more services requests to one or more agents, comprising:
   a memory; and
   at least one processor coupled to said memory and operative to:
   obtain one or more attributes of each service request;
   obtain one or more attributes of each agent;
   obtain feedback from each of one or more agent queues, the feedback from each of the one or more agent queues comprising an amount of time or resources each agent has spent on each service request, and a status of each service request, wherein the feedback from each of the one or more agent queues determining an estimate of an expected service time of each service request; and
   use the one or more attributes of each service request, the one or more attributes of each agent and the feedback from each of the one or more agent queues to determine two or more suitable agents to receive a dispatch for each of the one or more service requests, and to classify, each service request based upon the one or more attributes of each request and the one or more attributes of each agent.

20. The apparatus of claim 19, wherein in determining suitable agents to receive a dispatch for each of the one or more service requests, the at least one processor coupled to said memory is further operative to use at least one of a heuristic search algorithm and a mathematical optimization technique.

21. The apparatus of claim 19, wherein in determining suitable agents to receive a dispatch for each of the one or more service requests, the at least one processor coupled to said memory is further operative to:
   select a most appropriate agent based on agent skill, agent service time variability, service deadline, one or more system objectives and one or more constraints.

22. The apparatus of claim 19, wherein the at least one processor coupled to said memory is further operative to provide one or more queue level system status notifications.

* * * * *